Figure 1:
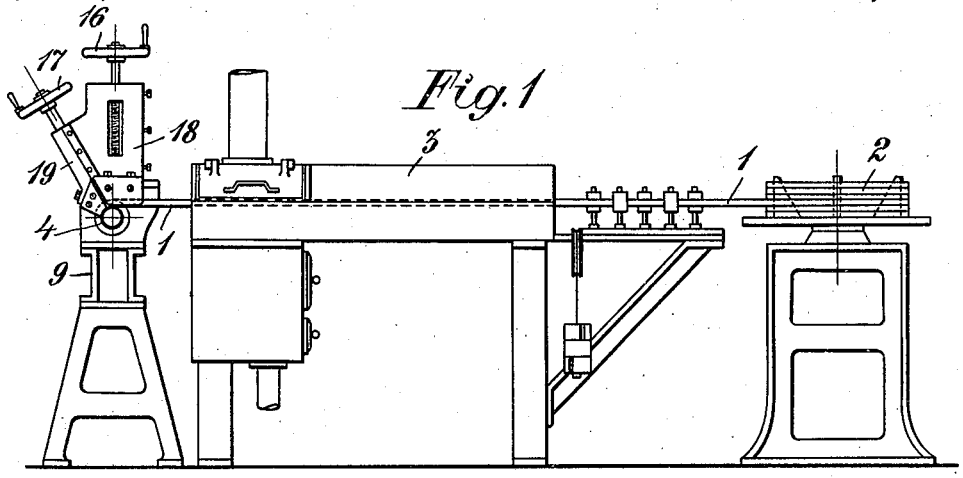

O. V. CARDELL.
APPARATUS FOR PRODUCING RIBBED PIPES, TUBES, OR THE LIKE.
APPLICATION FILED FEB. 12, 1916.

1,216,657.

Patented Feb. 20, 1917.

Inventor
Olof Valfrid Cardell
By
his Attorney

UNITED STATES PATENT OFFICE.

OLOF VALFRID CARDELL, OF ESKILSTUNA, SWEDEN.

APPARATUS FOR PRODUCING RIBBED PIPES, TUBES, OR THE LIKE.

1,216,657.  Specification of Letters Patent.   Patented Feb. 20, 1917.

Application filed February 12, 1916. Serial No. 77,939.

*To all whom it may concern:*

Be it known that I, OLOF VALFRID CARDELL, a citizen of Sweden, and resident of Eskilstuna, Sweden, have made a new and useful Invention in Apparatus for Producing Ribbed Pipes, Tubes, or the like, of which the following is a specification.

My invention is directed particularly to improvements in machines for producing ribbed pipes and the like provided with a screw formed wrought iron strip or ribbon wound externally upon the pipe. In existing types of such ribbed pipes several drawbacks are to be found on account of certain deficiencies in the manufacture. Usually the ribs consist of a thin sheet ribbon of uniform thickness and so thin at the connection with the pipe that the radiation from the rib, when the pipe is used as a heat radiator, will be very irregular, as the radiation is very little at the outer edge of the rib compared with the radiation nearer the pipe, whereby the object in view is missed. Another inconvenience is that the rib usually must be corrugated at the edge contiguous to the pipe, while this edge becomes shorter than the outer edge in the winding. By this corrugation dust and other filthy matter is always collected on the rib so that the radiation from the ribbed pipe to the air or the surrounding medium and vice versa is checked in a considerable degree. It is true that the rib before being wound around the pipe may be drawn through an oven for the purpose of heating it so that the outer edge may stretch itself in the winding, but this has not given any result, while the rib is cooled so quickly at the outer edge that it cannot stretch itself here, and moreover, the surface of contact between the pipe and the rib becomes so small that the rib does not answer the purpose. In the manufacture of ribbed pipes provided with a rib wound around the pipe it has also proved necessary to put a smelting metal wire between the edge of the rib and the pipe to get a better contact between them, but this method is open to the objection that it is difficult to locate the smelting wire in its right place and thus the method becomes too expensive.

According to the present invention the rib is in advance given such a cross section that the radiation from the finished ribbed pipe will be practically uniform over the whole surface of the rib, and the corrugation of the rib is wholly avoided. Furthermore, no insertion of a fusible metal is needed between the rib and the pipe for procuring a good contact. For this purpose the ribbon shaped wrought iron material is thicker at the edge nearest to the pipe and it may also be provided with a projecting part to one or both sides serving as a contact shoulder. The rib material is drawn from a roll through the oven, where it is heated immediately before it is fed through a specially adapted guiding device to the rotating pipe. The end of the rib material is fastened to a clamping chuck rotating with the pipe, and thus the thicker inwardly directed edge of the rib will be shortened and perfectly attached to the pipe during the rotation and longitudinal movement of the pipe, because the outer edge of the rib is cooled already so much that it cannot stretch itself. Not until the winding is finished are both ends of the rib welded to the pipe, and the rib has already by the cooling shrunk around the pipe in such a way that a perfect contact is procured between them even to the extent that the foot of the rib is powerfully pressed into the pipe. Thus there is no need for any other metallic connection between the inner edge of the rib and the pipe. On account of the greater thickness of the rib at its inner edge given to it in advance and the side projections it will be possible for the rib here to maintain the high temperature during the winding in such a way that it can shrink in its longitudinal direction without otherwise being deformed, while the outer edge of the rib on account of its smaller thickness already is comparatively cooler and therefore maintains its length.

In order to keep a rib of such a form in its proper position in relation to the pipe during the winding it is, however, necessary to have a guiding device of a special arrangement. Instead of using a guide provided as hitherto with a hole answering to the cross section of the rib material, the guide according to my invention consists of a plate or the like pressing against one side of the rib material, *i. e.* the side facing the part of the pipe already wound, and of one or two rolls on the other side of the rib material which rolls press the rib in its proper position.

Figure 2:
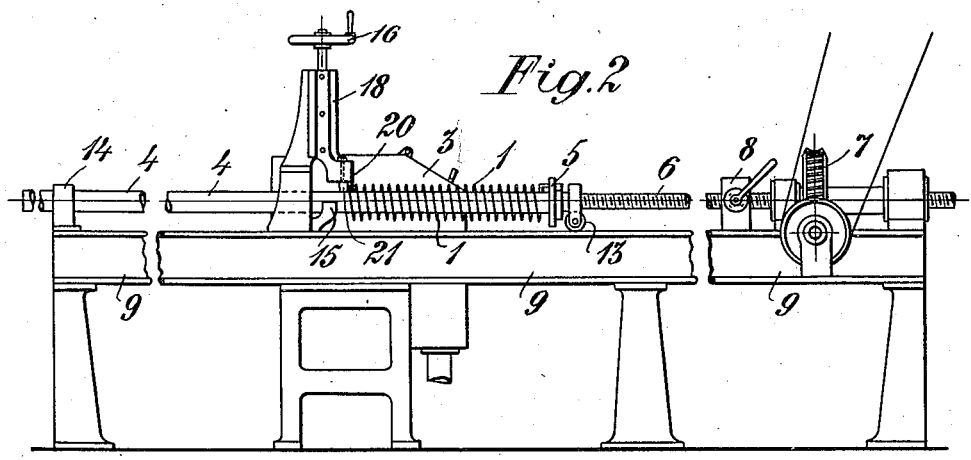
Figure 3:
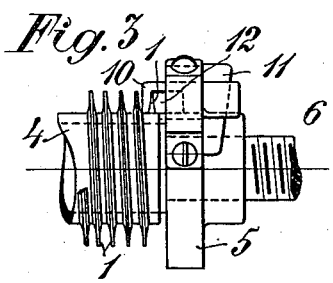
Figure 4:
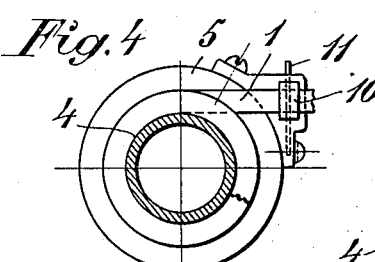
Figure 7:
Figure 5:
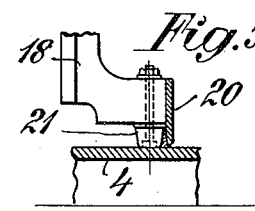
Figure 6:
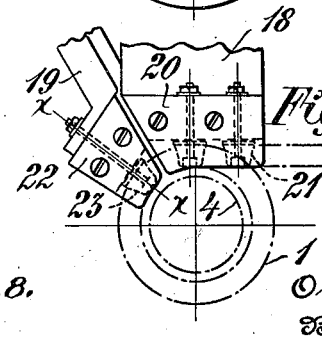
Figure 8:
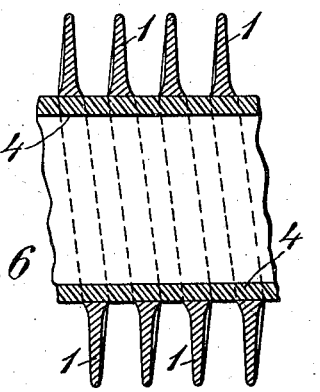

My invention will be fully understood by referring to the accompanying drawing, in which, Figure 1 is a front view of a machine for winding the screw formed rib around the pipe. Fig. 2 shows a side view of the same machine. Fig. 3 is a side view of a clamping chuck used, and Fig. 4 shows a front view of the same. Fig. 5 shows a longitudinal section of the pipe to be ribbed together with the guiding device for the rib and Fig. 6 shows a front view of the same. Fig. 7 is a longitudinal section through a part of the finished article and Fig. 8 is an enlarged sectional view of the guiding device taken along the line $x$—$x$ of Fig. 6.

Referring to the drawing for a full and clear understanding of the invention, such as will enable others skilled in the art to construct and use the same, 1 represents the wrought iron rib material which in a known way is drawn from the roll 2 through the oven 3 toward the pipe 4 which is going to be wound. The pipe 4 is fastened to the clamping chuck 5 on the screw 6, and the latter is put into rotation by means of a suitable driving arrangement, whereat the screw 6 is fed in its longitudinal direction by means of a nut applied on a firm support 8 in the frame 9. The nut is conveniently divided in two parts so that the screw 6 might be carried back to its starting position, after the nut has been opened without turning the screw backward. The screw 6 is provided with a longitudinal key-way embracing a key in the driving wheel 7 through which the screw passes freely. The chuck 9 has a gripping jaw 10 that is movable parallel with the screw, and this gripping jaw can be pressed against the end of the rib material 1 by means of a wedge 11 in such a way that the rib is jammed tight between the jaw 10 and a projection 12 on the chuck. The end of the screw 6 near the chuck may be supported by a roll 13, and the pipe 4 rests in bearings 14, 15 on the frame 9 during the winding of the rib.

The guiding device for the rib material consists of two slides 18, 19 that are movable toward the pipe 4 by means of hand wheels or the like 16, 17, and these slides carry the guiding members. The slide 18 is movable vertically and at its lower part provided with a guide plate 20 projecting below the same. The shape of that part of the guide plate which faces the rib material corresponds to the shape of the rib. Beneath the slide 18 rolls 21 are provided, these rolls having such a form that the opening between the rolls and the plate 20 perfectly answers to the cross section of the rib material. A plate 22 and a roll 23 are mounted on the slide 19, the axle of the roll 23 being directed toward the center of the pipe 4. The end of the rib material 1 is first fastened to the chuck whereafter the guide plates and rolls are screwed down into the position shown in the drawing and the rib is wound around the pipe.

I am aware that it is known to wind a rib around a pipe by feeding it through an oven and a guiding device and I make no claim hereinafter to include such a structural device, my invention being limited to the utilization of a special construction of guiding device for a rib material that is given a special cross section in advance and to the fastening of the end of the rib to a chuck in such a way that the pipe to be wound does not serve as driver for the rib.

Having thus described my invention what I claim and desire to secure by Letters Patent of the United States is:—

1. Apparatus for producing ribbed pipes, tubes and the like by feeding a wrought iron rib material through an oven for heating it to a rotating pipe, comprising means for continuously winding the rib material in successive spirals around the tube including means for continuously advancing the rotating tube in its longitudinal direction in combination with a chuck rotating with the pipe and provided with means for fastening one end of the rib, together with a guiding device for the rib provided with a plate on one side of the rib and rolls on the other side, the rolls and the side of the plate facing the rib having a shape that answers to the shape of the rib which is thicker at the edge facing the pipe than at the outer edge.

2. Apparatus for producing ribbed pipes, tubes and the like by feeding a wrought iron rib material through an oven for heating it to a rotating pipe, comprising means for continuously winding the rib material in successive spirals around the tube including means for continuously advancing the rotating tube in its longitudinal direction in combination with a chuck rotating with the pipe and provided with means for fastening one end of the rib, together with a guiding device for the rib provided with plates on one side of the rib and rolls on the other side, the rolls and the plates being movable in a direction toward and from the center of the pipe.

3. Apparatus for producing ribbed pipes, tubes and the like by feeding a metallic rib material through an oven for heating it to a rotating pipe, comprising means for continuously winding the rib material in successive spirals around the tube, including means for continuously advancing the rotating tube in its longitudinal direction in combination with a chuck rotating with the pipe and provided with means for fastening one end of the rib, and a guiding device for the rib.

4. Apparatus for producing ribbed pipes, tubes and the like by feeding a metallic rib material through an oven for heating it to a rotating pipe, comprising means for continuously winding the rib material in successive spirals around the tube, including means for continuously advancing the rotating tube in its longitudinal direction in combination with a chuck, at one end of said pipe and rotating therewith, and provided with a clamp for gripping one end of the rib, and a guiding device for the rib.

5. Apparatus for producing ribbed pipes, tubes and the like by feeding a metallic rib material through an oven for heating it to a rotating pipe, comprising means for continuously winding the rib material in successive spirals around the tube, including means for continuously advancing the rotating tube in its longitudinal direction in combination with a chuck rotating with the pipe and provided with means for fastening one end of the rib, and a guiding device for the rib, comprising a plate at one side of the rib and rolls at the other side, said rolls and the side of the plate facing the rib, having a shape corresponding to the cross section of the rib.

In testimony whereof, I have signed my name to this specification in the presnce of two subscribing witnesses.

OLOF VALFRID CARDELL.

Witnesses:
GRETA PRIERE,
SALLY GUDE.